United States Patent [19]

Grandclement

[11] 4,165,764

[45] Aug. 28, 1979

[54] VALVE

[75] Inventor: Gérald Grandclement, Cap d'Ail, France

[73] Assignee: International Cold Forging Corporation, Monaco, France

[21] Appl. No.: 816,357

[22] Filed: Jul. 18, 1977

[30] Foreign Application Priority Data

Jul. 20, 1976 [MC] Monaco ................................. 1207

[51] Int. Cl.² ................................................ F15D 1/08
[52] U.S. Cl. ........................................ 138/43; 138/42;
138/45; 138/46; 137/504; 137/517
[58] Field of Search ................... 138/42, 43, 45 A, 46;
137/863, 877, 504, 512.15, 517

[56] References Cited

U.S. PATENT DOCUMENTS

| 1,299,762 | 4/1919 | Nelson | 137/512.15 X |
|---|---|---|---|
| 1,780,121 | 10/1930 | Dunning | 137/512.15 X |
| 2,289,905 | 7/1942 | Dasher | 138/43 X |
| 2,545,789 | 3/1951 | Miller | 138/43 X |
| 2,948,296 | 8/1960 | Thorburn | 138/43 X |
| 3,195,579 | 7/1965 | Bordeaux et al. | 138/43 |
| 3,409,050 | 11/1968 | Weese | 138/43 X |
| 3,470,915 | 10/1969 | Bitzer et al. | 138/43 |
| 3,592,237 | 7/1971 | Borschers | 138/43 |
| 3,768,507 | 10/1973 | Dicken | 137/517 X |
| 3,908,694 | 9/1975 | Spears | 137/877 X |

*Primary Examiner*—Richard E. Aegerter
*Assistant Examiner*—James E. Bryant, III
*Attorney, Agent, or Firm*—Frishauf, Holtz, Goodman & Woodward

[57] ABSTRACT

A valve comprises a tube having an inner wall surface inwardly stepped to provide a ribbed peripheral seat in a plane perpendicular to the axis of the tube and between inlet and outlet chambers bounded by tube lengths of relatively greater and relatively smaller cross-sections respectively. A washer disk or resilient material sized to fit with peripheral clearance within the inlet chamber is held spaced from the peripheral step base by ribs outstanding therefrom.

9 Claims, 10 Drawing Figures

VALVE

The present invention relates to valves for the distribution of water or other fluids, the output volume of which is required to remain constant or approximately constant when the pressure of the fluid supply varies.

In order to ensure that certain machines, in particular washing machines, function correctly, it is necessary for the volume of water available to be approximately constant. Moreover, when the valves in question have several outlets, it is necessary for the various outlets to have outputs which are adjusted to certain requirements, as for example the provision of further liquids or the renewing of water softeners.

Hitherto, such output volumes have generally been regulated either by placing in the valve inlet portion an element comprising two parts, one of which is resilient and is pressed against the other, thus closing off apertures defined by said two parts, or by placing in the valve inlet a resilient element containing an aperture, the element being so constructed that as the pressure of the water supply causes deformation thereof, the diameter of its aperture diminishes, thus regulating the flow. Of these two accepted solutions, the first one, in addition to requiring a further working part, creates the risk of considerable hydraulic vibration caused by the water circulating at high speed between the valve body and the regulator element. The second solution involves the use of resilient elements of very high precision and offers regulation only within restricted limits.

Normally, the different volumes are obtained in the various outlets of multi-way valves by placing at the inlet a regulator with the highest volume and in each particular outlet regulators of the same type adjusted for lower outputs.

Such an arrangement requires a large number of parts and is also expensive to manufacture. Moreover, the output regulators cannot regulate volumes as great as those of the input regulators. Thus, by the systems at present in use it is impossible to regulate high volumes of output unless by elaborating the regulators in a prohibitive manner.

The object of the present invention is to construct the inlet chamber of the valve body so that, in conjunction with a resilient washer of simple construction, it provides means for adjusting the output of a simple valve, or to adjust to different volumes in a valve with one inlet and several outlets, even although said outputs are of great volume and are not dissimilar to each other.

The valve according to the invention comprises a tube having an inner wall surface stepped inwardly to provide a base for a peripheral valve seat perpendicular to the longitudinal axis of said tube. The actual valve seat is provided by ribs rising from this base. Inlet and outlet chambers are bounded by tube lengths of relatively greater and relatively smaller cross-section on either side of the inward step on which the ribs providing the valve seat are located. A washer disk of resilient material that is backed on to the valve seat ribs that have their top surfaces lying substantially in a plane perpendicular to the tube axis, is the movable part of the valve. The washer disk is shaped and sized to leave free and unobstructed a continuous gap between the periphery of the washer disk and the inner wall surface bounding the inlet chamber. Between the ribs in the space between the base and the flexible washer disk are fan-shaped passages, which are wider than the ribs even at the narrowest part of the passages. Preferably these passages are substantially flat-bottomed.

In use of the valve, the resilient washer disk is pressed against the ribs to an extent governed by the pressure of the fluid supply and regulates the flow. By this arrangement a cumbersome internal element possibly producing hydraulic vibration when there is play between said element and the inlet chamber of the valve body, is no longer necessary.

The valve may include a fluid-tight partition means dividing said outlet chamber longitudinally into a plurality of parts each having an outlet therefrom, said partition means projecting beyond the plane of the base of the seat ribs and also being backed onto by said washer disk.

The partition means separate the branches of a multi-way valve from one another.

Some seat ribs preferably project more than others from the rib base, or are wider than others. Means are provided which prevent displacement of the washer disk transversely to the longitudinal direction of the tube.

In order to facilitate comprehension of the invention an embodiment will now be described, by way of example and of a non-limitative character, with reference to the accompanying drawings, in which.

Figure 2:
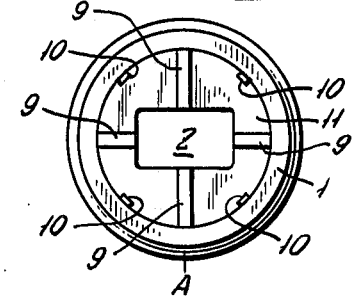
FIG. 2 is an axial view the base of the inlet chamber of the body of said valve with the washer disk removed.
Figure 3:
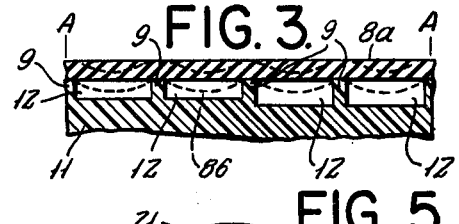
FIG. 3 is a developed view of the base portion of said chamber with the washer disk in place, in circumferential section.
Figure 5:
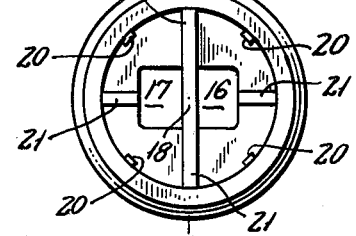
FIG. 5 is an axial view of the base of the inlet chamber of the valve of FIG. 4, with the washer disk removed.
Figure 6:
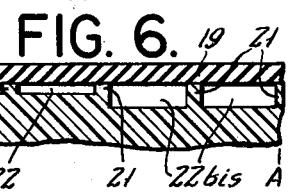
Figure 8:
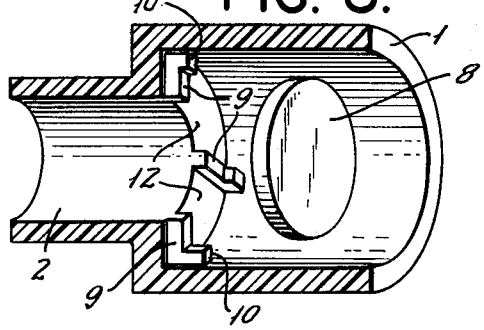
Figure 7:
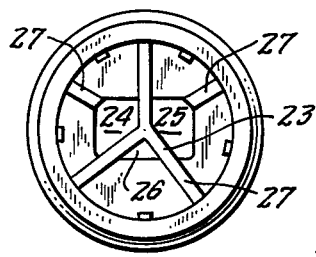

FIGS. 6 and 7 slow modification of the base an inlet chamber, FIG. 6 in a developed view like FIG. 3 and FIG. 7 in an axial view like FIGS. 2 and 5, and FIG. 8 is a cut-away perspective exploded view, of another modification of the base portion of an inlet chamber.

Figure 4:
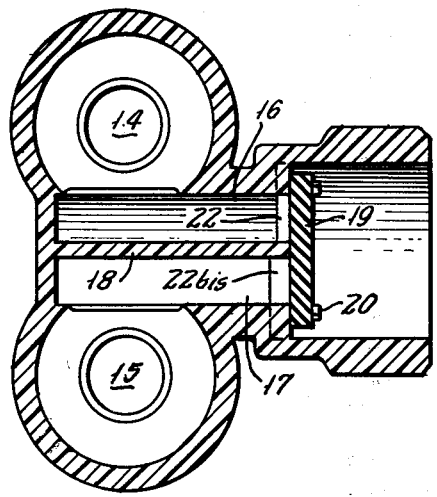
FIG. 4 is a section through a valve body with two outlets.
Figure 9:
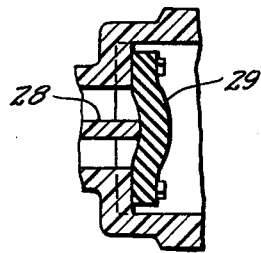
Figure 10:
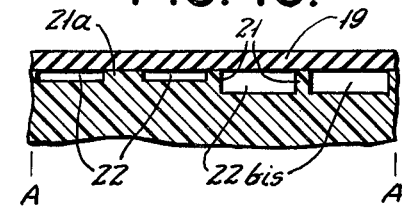

FIG. 9 is a cross-section of a modification of FIG. 4 in which the partition projects more upstream than the other ribs; and FIG. 10 is a modification of FIG. 6 illustrating another modification of FIG. 4 in which one rib is shown wider than the other ribs.

Figure 1:
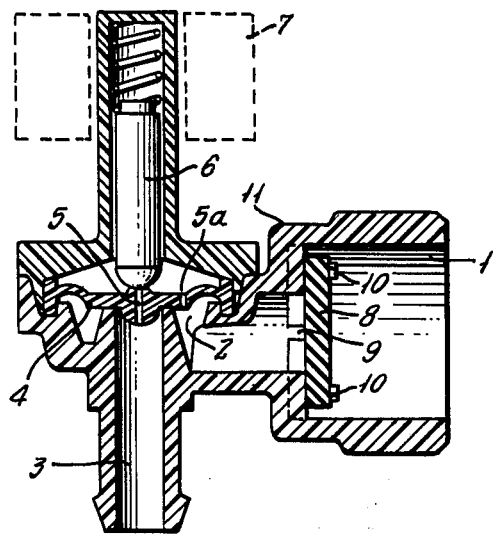
FIG. 1 shows, in section, a flow-regulating valve according to the invention having one outlet leading to an electrically controlled valve.

Referring now to FIG. 1, the figure shows an electric valve with one outlet; the inlet chamber 1 is of tubular form, the control chamber, which is the outlet chamber for the flow-regulator, is shown at 2 and at 3 is shown the outlet of the electric valve which is normally closed off by a membrane 4 having pilot holes 5 and 5a, the pilot hole 5 being normally sealed off by the core 6 of an electromagnet 7, not shown in detail. When current passes through the electromagnet, the core 6 is raised, disengaging the hole 5 and permitting the membrane 4 in turn to rise under the effect of the pressure. The chamber 2, which was under the pressure of the fluid supply when the valve was closed, is at the output pressure, which is generally very low.

The right-hand side of the rubber washer dish 8 then comes under the pressure of the fluid supply and is pressed against the radial ribs 9 on the body 1 which can be seen from the front in FIG. 2, which is an axial view of the inlet chamber of the valve with the disk 8 removed.

The resilient washer disk 8 is maintained in diametrical or central position by small longitudinal ribs 10 on the inner cylindrical surface of the chamber 1 of the valve body 1.

The manner of working of the regulator may be seen from FIGS. 2 and 3. FIG. 3 is a developed radial view of the circular inlet chamber 1, in cylindrical section spread out on a single plane of the circular inlet chamber 1. The fluid entering through the chamber 1 passes between the gap between the edge of the washer disk 8 and the cylindrical wall of the chamber 1 which has an internal diameter greater than the diameter of the disk 8. The fluid then passes between the washer disk 8 and the end or base 11 of the inlet chamber 1 through the spaces 12, complete compression of the washer on the entire seat base 11 being prevented by the ribs 9 which seat the washer disk spaced away from the base of the ribs. When the pressure of the fluid supply is low, the washer disk is not deformed and assumes its normal shape as shown in 8a in FIG. 3. The passages 12 are large than in a cross-section; they become small in cross-section when, under the higher pressure, the washer disk assumes the position 8b. A suitable correlation between the thickness and hardness of the washer disk 8, the structure of the ribs 9 and of the passages 12 between the ribs, enable the desired output to be regulated. Different heights and sections of rib may be employed in order to provide the most satisfactory method of regulating output.

As shown in FIGS. 2, 5 and 7, the passages between the ribs are fan-shaped because the generally radial ribs converge towards the center, but even at their narrowest, they are wider than the ribs. As illustrated in FIG. 6, the depth of these fan-shaped passages is not necessarily the same for all of them, as it is in FIG. 3, but they are preferably flat-bottomed in both cases.

FIG. 4 is a sectional view from above of an electric valve with inlet 13 and two branches or outlets 14 and 15. FIG. 5 is a view of the seat of the inlet chamber 13 of the valve of FIG. 4 and FIG. 6 is a developed view of said circular seat.

The control chambers 16 and 17 of the two outlet branches are separated by a partition 18 provided in the valve body. The partition 18 extends into the inlet chamber 13 so that the resilient washer disk 19, produced preferably from a polymer substance, is applied against it by the fluid pressure, thus separating completely the two branches of the valve and also defining two areas on the base 11. The resilient washer disk 19 is centred within the inlet chamber by small ribs 20. It is applied against the partition 18 and ribs 21, also provided in the valve body. The ribs 21 define passages 22 and 22 bis shown in FIG. 6, the passages 22 providing a way to the outlet 14 and the passages 22 bis for the outlet 15. As previously stated in relation to the simple valve, a suitable choice of dimensions for the ribs in relation to the resilient washer disk enables the outputs to be regulated. When the passages 22 or 22 bis are of different dimensions, the outputs obtained in the two branches are different and independent of each other.

The invention lends itself to various possibilities. When, for example, a three-way valve is required, with three different outputs, it is necessary simply to provide a star-shaped rib and partition formation 23 (see FIG. 7) in the body of a three-way valve, which formation separates the three control chambers 24, 25 and 26. The resilient washer (not illustrated) is applied against the star rib and partition formation, and also against the ribs 27, an arrangement which offers three different outputs, variously regulated.

As mentioned before, the ribs supporting the washer disk, instead of projecting so that their upstream surfaces lie in the same plane as shown in FIGS. 1, 3, 4, 6 and 8, may be constituted so that some project upstream more than others, and, likewise the partition may project farther upstream. This is shown, for example, in FIG. 9 which illustrates the case of a modification of the structure of FIGS. 4 and 5 in which the partition 28, corresponding to the partition 18 of FIGS. 4 and 5, projects more than the rib 31. In FIG. 9 the washer disk 29 is in its fully stressed condition.

FIG. 10 illustrates the case of one rib 21a being wider than the others, this figure being otherwise identical with FIG. 6.

When, for example, two branches are required to have the same output, it is sufficient to arrange that the body partition separating the control chambers does not reach the inlet chamber, so that the two branches are interconnected by way of their control chambers.

It is manifest that the above description of the present invention is offered merely by way of example of a non-limitative character and that various advantageous modifications may be envisaged without thereby departing from the framework of the invention.

I claim:

1. A flow-regulating valve comprising a tube having an inner wall surface stepped inwardly to provide a base on which ribs are provided having top surfaces lying substantially in a plane defining a peripheral valve seat perpendicular to the longitudinal axis of said tube, said base providing a plurality of fan-shaped and substantially flat-bottomed passages that are wide compared to said ribs, and run between an inlet chamber bounded by said inner wall surface adjacent to the inwardly stepped part thereof and an outlet chamber of smaller cross-section than said inlet chamber and bounded by said inner wall surface beyond the inward step, further comprising a washer disk of resilient material backed onto said ribs forming said peripheral valve seat, said washer disk being shaped and sized to leave free and unobstructed a continuous gap between the periphery of said washer disk and said inner wall surface bounding said inlet chamber, and further comprising fluid-tight partition means dividing said outlet chamber longitudinally into a plurality of parts each having an outlet therefrom, said partition means projecting beyond said base on which said ribs are provided and also being backed onto by said washer disk, whereby the amounts of flow into said respective outlets of said respective parts of said outlet chamber are regulated by deformation of said washer disk into the fan-shaped channels leading into the respective outlet chamber parts, in each case according to channel depth and width.

2. A flow-regulating valve as set forth in claim 1, including means for positioning said washer disk on said ribs and partition.

3. A flow-regulating valve as set forth in claim 2, wherein said positioning means are longitudinal ribs formed on said inner wall surface of the tube length bounding said inlet chamber.

4. A flow-regulating valve as set forth in claim 1, wherein said seat-forming ribs are radial with respect to the longitudinal axis of said tube.

5. A flow-regulating valve as set forth in claim 1, wherein said partition means project further beyond said base than do said seat-forming ribs.

6. A flow-regulating valve as set forth in claim 1, wherein some seat ribs project more than others.

7. A flow-regulating valve as set forth in claim 2, wherein some seat ribs are wider than others.

8. A flow-regulating valve as set forth in claim 1 in which the upstream edge surface of said partition lies substantially in said plane in which the tops of said ribs lie.

9. A flow-regulating valve as set forth in claim 8 in which said base, provided by said inward step of said inner wall of said tube, being subdivided into portions bounded radially by said ribs and by said partition, has some of the portions so bounded which are situated at a first spacing from said plane in which the tops of said ribs lie and others situated at at least one, different spacing from said plane.

* * * * *